United States Patent
Wang et al.

(10) Patent No.: US 9,825,771 B2
(45) Date of Patent: Nov. 21, 2017

(54) METHOD AND DEVICE FOR ESTABLISHING MULTICAST DATA CHANNEL IN NETWORK VIRTUALIZATION SYSTEM

(71) Applicant: Huawei Technologies Co., Ltd., Shenzhen, Guangdong (CN)

(72) Inventors: Xinping Wang, Beijing (CN); Xiaoqian Wu, Shenzhen (CN); Jiehui Hu, Beijing (CN); Guoqi Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 14/820,128

(22) Filed: Aug. 6, 2015

(65) Prior Publication Data
US 2015/0349970 A1   Dec. 3, 2015

Related U.S. Application Data

(63) Continuation of application No. PCT/CN2013/071466, filed on Feb. 6, 2013.

(51) Int. Cl.
*H04L 12/18* (2006.01)
*H04L 12/761* (2013.01)
(Continued)

(52) U.S. Cl.
CPC ........ *H04L 12/185* (2013.01); *H04L 12/4625* (2013.01); *H04L 45/16* (2013.01); *H04L 45/58* (2013.01); *H04L 45/64* (2013.01)

(58) Field of Classification Search
CPC ... H04L 12/185; H04L 12/4625; H04L 45/16; H04L 45/64; H04L 45/58
See application file for complete search history.

(56) References Cited

U.S. PATENT DOCUMENTS

| 7,477,642 B2 * | 1/2009 | Aggarwal | H04L 12/66 370/390 |
|---|---|---|---|
| 2007/0217415 A1 | 9/2007 | Wijnands et al. | |

(Continued)

FOREIGN PATENT DOCUMENTS

| CN | 101013950 A | 8/2007 |
|---|---|---|
| CN | 101035057 A | 9/2007 |

(Continued)

OTHER PUBLICATIONS

J. Medved, et al., "MPLS-TP Pseudowire Configuration using OpenFlow 1.3", Network Working Group, Jul. 10, 2012, 20 pages.

*Primary Examiner* — Peter Chau

(57) ABSTRACT

The method of establishing a multicast data channel in a network virtualization system includes: creating, on a controller, a virtual remote logical interface for an external interface of a remote node; generating, a multicast tree tunnel that uses a core node as a root, and obtaining a multicast protocol packet sent by a device outside the network virtualization system; acquiring, a multicast source address and a multicast group address from the multicast protocol packet, and generating a multicast forwarding table; searching, the multicast forwarding table for an external interface of the core node, searching for an outbound interface of the multicast tree tunnel on the core node according to the multicast tree tunnel, and generating a P2MP PW forwarding table of the core node, and sending the P2MP PW forwarding table of the core node to the core node. The method implements a multicast service in a virtual cluster router.

6 Claims, 7 Drawing Sheets

(51) Int. Cl.
*H04L 12/46* (2006.01)
*H04L 12/715* (2013.01)
*H04L 12/775* (2013.01)

(56) References Cited

U.S. PATENT DOCUMENTS

| | | | |
|---|---|---|---|
| 2008/0056258 A1* | 3/2008 | Sharma | H04L 45/00 370/390 |
| 2009/0175274 A1 | 7/2009 | Aggarwal et al. | |
| 2010/0054245 A1 | 3/2010 | Asati et al. | |
| 2013/0010790 A1* | 1/2013 | Shao | H04L 45/16 370/390 |

FOREIGN PATENT DOCUMENTS

| | | |
|---|---|---|
| CN | 102137000 A | 7/2011 |
| EP | 2 518 949 A1 | 10/2012 |
| EP | 2 518 952 A1 | 10/2012 |

* cited by examiner

METHOD AND DEVICE FOR ESTABLISHING MULTICAST DATA CHANNEL IN NETWORK VIRTUALIZATION SYSTEM

CROSS-REFERENCE TO RELATED APPLICATIONS

This application is a continuation of International Application No. PCT/CN2013/071466, filed on Feb. 6, 2013, which is hereby incorporated by reference in its entirety.

TECHNICAL FIELD

Embodiments of the application relate to communications technologies, and in particular, to a method and a device for establishing a multicast data channel in a network virtualization system.

BACKGROUND

A conventional network architecture has a two-layer or multi-layer structure, and according to a function and a deployment location of each layer, a network may be divided into different layers (including a core layer, a convergence layer, an edge access layer, and a peer layer), where the layers are generally connected to one another by means of dual-homing redundant connections to improve reliability and converge user traffic layer by layer. The access layer is responsible for network access of a user terminal, is used to provide various types of user interfaces, and has widely distributed nodes and a large number of interfaces; the convergence layer is responsible for converging traffic of access nodes, is used to extend a service scope of a core node, and has various interface types, a strong convergence capability, and an integrated service processing capability; and the core layer is responsible for high-speed forwarding and service interworking between regions, and has a small number of nodes.

To integrate and simplify a network structure and improve resource utilization, in an existing network architecture, during point-to-multipoint packet switching, a method of forming a network virtualization system by using two or more main switching devices at a same network layer is used, thereby reducing complexity caused by use of multiple redundant components, and reducing a cost.

In addition, currently, to adapt to a huge capacity of data exchange between devices in a cluster, multiple high-end routers are connected to a central switch matrix chassis by using a very short reach optical fiber, to form a network virtualization system, namely, a cluster router, which includes multiple routers, thereby facilitating centralized management.

Therefore, how to enable the foregoing network virtualization system to support a multicast service becomes a technical problem to be resolved currently.

SUMMARY

In view of this, the application provides a method and a device for establishing a multicast data channel in a network virtualization system, which are used to resolve a problem in the prior art that a cluster router cannot implement a multicast service.

According to a first aspect, an embodiment of the application provides a method for establishing a multicast data channel in a network virtualization system, including:

creating, on a controller, a virtual remote logical interface for an external interface of a remote node, where the external interface of the remote node is an interface used to connect to another network device;

generating, by the controller, a multicast tree tunnel that uses a core node as a root;

obtaining, by the controller, a multicast protocol packet, where the multicast protocol packet is a protocol packet sent by a device outside the network virtualization system by using the remote node or the core node of the network virtualization system;

acquiring, by the controller, a multicast source address and a multicast group address from the multicast protocol packet;

generating, by the controller, a multicast forwarding table according to the multicast source address, the multicast group address, a multicast inbound interface, and a multicast outbound interface, where the multicast outbound interface includes an external interface of the core node and the virtual remote logical interface;

allocating, by the controller, a point-to-multipoint pseudo wire (P2MP PW) label to the multicast source address and the multicast group address;

searching, by the controller, the multicast forwarding table for the external interface of the core node, searching for an outbound interface of the multicast tree tunnel on the core node according to the multicast tree tunnel, and generating a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and sending, by the controller, the P2MP PW multicast forwarding table of the core node to the core node, so that the core node forwards a multicast data packet according to the P2MP PW multicast forwarding table.

With reference to the first aspect, in a first possible implementation manner, the method further includes:

searching, by the controller, the multicast forwarding table for the virtual remote logical interface;

acquiring, by the controller, the external interface of the remote node according to a mapping relationship between the virtual remote logical interface and the external interface of the remote node;

searching, by the controller, for an outbound interface of the multicast tree tunnel on the remote node according to the multicast tree tunnel;

generating, by the controller, a P2MP PW multicast forwarding table of the remote node according to the external interface of the remote node, the outbound interface of the multicast tree tunnel on the remote node, and the P2MP PW label; and sending, by the controller, the P2MP PW multicast forwarding table of the remote node to the remote node, so that the remote node forwards a multicast data packet according to the P2MP PW multicast forwarding table.

With reference to the first aspect, in a second possible implementation manner, the multicast inbound interface is an outbound interface that is corresponding to the multicast source address and in a preset unicast forwarding table searched according to the multicast source address.

With reference to the first aspect and the foregoing possible implementation manners, in a third possible implementation manner, the obtaining, by the controller, a multicast protocol packet specifically includes:

if the multicast protocol packet is a protocol packet that is sent by the device outside the network virtualization system and received by the remote node, receiving, by the controller, the multicast protocol packet transparently transmitted through a point-to-point pseudo wire P2P PW established between the core node and the remote node, and through a control channel between the core node and the controller; or if the multicast protocol packet is a protocol packet that is sent by the device outside the network virtualization system and received by the core node, receiving, by the controller, the multicast protocol packet through a control channel between the core node and the controller.

According to a second aspect, an embodiment of the application provides a method for establishing a multicast data channel in a network virtualization system, including:

creating, on a core node, a virtual remote logical interface for an external interface of a remote node, where the external interface of the remote node is an interface used to connect to another network device;

generating, by the core node, a multicast tree tunnel that uses the core node as a root;

obtaining, by the core node, a multicast protocol packet, where the multicast protocol packet is a protocol packet sent by a device outside the network virtualization system by using the remote node or the core node of the network virtualization system;

acquiring, by the core node, a multicast source address and a multicast group address from the multicast protocol packet;

generating, by the core node, a multicast forwarding table according to the multicast source address, the multicast group address, a multicast inbound interface, and a multicast outbound interface, where the multicast outbound interface includes an external interface of the core node and the virtual remote logical interface;

allocating, by the core node, a P2MP PW label to the multicast source address and the multicast group address;

searching, by the core node, the multicast forwarding table for the external interface of the core node, searching for an outbound interface of the multicast tree tunnel on the core node according to the multicast tree tunnel, and generating a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and saving, by the core node, the P2MP PW multicast forwarding table of the core node, so that the core node forwards a multicast data packet according to the P2MP PW multicast forwarding table.

With reference to the second aspect, in a first possible implementation manner, the method further includes:

searching, by the core node, the multicast forwarding table for the virtual remote logical interface;

acquiring, by the core node, the external interface of the remote node according to a mapping relationship between the virtual remote logical interface and the external interface of the remote node;

searching, by the core node, for an outbound interface of the multicast tree tunnel on the remote node according to the multicast tree tunnel;

generating, by the core node, a P2MP PW multicast forwarding table of the remote node according to the external interface of the remote node, the outbound interface of the multicast tree tunnel on the remote node, and the P2MP PW label; and sending, by the core node, the P2MP PW multicast forwarding table of the remote node to the remote node, so that the remote node forwards a multicast data packet according to the P2MP PW multicast forwarding table.

With reference to the second aspect, in a second possible implementation manner, the multicast inbound interface is an outbound interface that is corresponding to the multicast source address and in a preset unicast forwarding table searched according to the multicast source address.

With reference to the second aspect and the foregoing possible implementation manners, in a third possible implementation manner, the obtaining, by the core node, a multicast protocol packet specifically includes:

if the multicast protocol packet is a protocol packet that is sent by the device outside the network virtualization system and received by the remote node, receiving, by the core node, the multicast protocol packet transparently transmitted through a point-to-point pseudo wire P2P PW established between the core node and the remote node, and through a control channel between the core node and a controller.

According to a third aspect, an embodiment of the application provides a control device, where the control device is located in a network virtualization system and includes:

a creating unit, configured to create, on the control device, a virtual remote logical interface for an external interface of a remote node, where the external interface of the remote node is an interface used to connect to another network device;

a generating unit, configured to: after the creating unit creates the virtual remote logical interface, generate a multicast tree tunnel that uses a core node as a root;

an obtaining unit, configured to: after the generating unit generates the multicast tree tunnel, obtain a multicast protocol packet, where the multicast protocol packet is a protocol packet sent by a device outside the network virtualization system by using the remote node or the core node of the network virtualization system;

an acquiring unit, configured to: after the obtaining unit obtains the multicast protocol packet, acquire a multicast source address and a multicast group address from the multicast protocol packet, where the generating unit is further configured to: after the acquiring unit acquires the multicast source address and the multicast group address, generate a multicast forwarding table according to the multicast source address, the multicast group address, a multicast inbound interface, and a multicast outbound interface, where the multicast outbound interface includes an external interface of the core node and the virtual remote logical interface;

an allocating unit, configured to allocate a P2MP PW label to the multicast source address and the multicast group address;

a search unit, configured to: after the generating unit generates the multicast forwarding table, search the multicast forwarding table for the external interface of the core node, where the generating unit is further configured to: after the search unit finds the external interface of the core node, search for an outbound interface of the multicast tree tunnel on the core node according to the multicast tree tunnel, and generate a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and a sending unit, configured to: after the generating unit generates the P2MP PW multicast forwarding table, send the P2MP PW multicast forwarding table of the core node to the core node, so that the core node forwards a multicast data packet according to the P2MP PW multicast forwarding table.

With reference to the third aspect, in a first possible implementation manner, the search unit is further configured to search the multicast forwarding table for the virtual remote logical interface;

the acquiring unit is further configured to acquire the external interface of the remote node according to a mapping relationship between the virtual remote logical interface and the external interface of the remote node;

the search unit is further configured to search for an outbound interface of the multicast tree tunnel on the remote node according to the multicast tree tunnel;

the generating unit is further configured to generate a P2MP PW multicast forwarding table of the remote node according to the external interface of the remote node, the outbound interface of the multicast tree tunnel on the remote node, and the P2MP PW label; and the sending unit is further configured to send the P2MP PW multicast forwarding table of the remote node to the remote node, so that the remote node forwards a multicast data packet according to the P2MP PW multicast forwarding table.

With reference to the third aspect, in a second possible implementation manner, the multicast inbound interface is an outbound interface that is corresponding to the multicast source address and in a preset unicast forwarding table searched according to the multicast source address.

With reference to the third aspect and the foregoing possible implementation manners, in a third possible implementation manner, the obtaining unit is specifically configured to:

when the multicast protocol packet is a protocol packet that is sent by the device outside the network virtualization system and received by the remote node, receive the multicast protocol packet transparently transmitted through a point-to-point pseudo wire P2P PW established between the core node and the remote node, and through a control channel between the core node and the controller; or when the multicast protocol packet is a protocol packet that is sent by the device outside the network virtualization system and received by the core node, receive the multicast protocol packet through a control channel between the core node and the controller.

According to a fourth aspect, an embodiment of the application provides a communications device, where the communications device is located in a network virtualization system, and the communications device includes:

a creating unit, configured to create, on the communications device, a virtual remote logical interface for an external interface of a remote node, where the external interface of the remote node is an interface used to connect to another network device;

a generating unit, configured to: after the creating unit creates the virtual remote logical interface, generate a multicast tree tunnel that uses the communications device as a root;

an obtaining unit, configured to: after the generating unit generates the multicast tree tunnel, obtain a multicast protocol packet, where the multicast protocol packet is a protocol packet sent by a device outside the network virtualization system by using the remote node or the communications device of the network virtualization system;

an acquiring unit, configured to: after the obtaining unit obtains the multicast protocol packet, acquire a multicast source address and a multicast group address from the multicast protocol packet, where the generating unit is further configured to: after the acquiring unit acquires the multicast source address and the multicast group address, generate a multicast forwarding table according to the multicast source address, the multicast group address, a multicast inbound interface, and a multicast outbound interface, where the multicast outbound interface includes an external interface of the communications device and the virtual remote logical interface;

an allocating unit, configured to allocate a P2MP PW label to the multicast source address and the multicast group address;

a search unit, configured to: after the generating unit generates the multicast forwarding table, search the multicast forwarding table for the external interface of the communications device, and search for an outbound interface of the multicast tree tunnel on the communications device according to the multicast tree tunnel, where the generating unit is further configured to: after the search unit finds the outbound interface of the communications device, generate a point-to-multipoint pseudo wire P2MP PW multicast forwarding table of the communications device according to the multicast source address, the multicast group address, the P2MP PW label, the multicast inbound interface, the external interface of the communications device, and the outbound interface of the multicast tree tunnel on the communications device; and a saving unit, configured to: after the generating unit generates the P2MP PW multicast forwarding table, save the P2MP PW multicast forwarding table of the communications device, so that the communications device forwards a multicast data packet according to the P2MP PW multicast forwarding table.

With reference to the fourth aspect, in a first possible implementation manner, the communications device further includes: a sending unit, where, the search unit is further configured to search the multicast forwarding table for the virtual remote logical interface;

the acquiring unit is further configured to acquire the external interface of the remote node according to a mapping relationship between the virtual remote logical interface and the external interface of the remote node;

the search unit is further configured to search for an outbound interface of the multicast tree tunnel on the remote node according to the multicast tree tunnel;

the generating unit is further configured to generate a P2MP PW multicast forwarding table of the remote node according to the external interface of the remote node, the outbound interface of the multicast tree tunnel on the remote node, and the P2MP PW label; and the sending unit is configured to send the P2MP PW multicast forwarding table of the remote node to the remote node, so that the remote node forwards a multicast data packet according to the P2MP PW multicast forwarding table.

With reference to the fourth aspect, in a second possible implementation manner, the multicast inbound interface is an outbound interface that is corresponding to the multicast source address and in a preset unicast forwarding table searched according to the multicast source address.

With reference to the fourth aspect and the foregoing possible implementation manners, in a third possible implementation manner, the obtaining unit is specifically configured to:

when the multicast protocol packet is a protocol packet that is sent by the device outside the network virtualization system and received by the remote node, receive the multicast protocol packet transparently transmitted through a point-to-point pseudo wire P2P PW established between the communications device and the remote node, and through a control channel between the communications device and a controller.

According to a fifth aspect, an embodiment of the application provides a control device, where the control device is located in a network virtualization system, and the control device includes:

a processor, configured to create a virtual remote logical interface for an external interface of a remote node, where the external interface of the remote node is an interface used to connect to another network device;

generate a multicast tree tunnel that uses a core node as a root;

obtain a multicast protocol packet, where the multicast protocol packet is a protocol packet sent by a device outside the network virtualization system by using the remote node or the core node of the network virtualization system;

acquire a multicast source address and a multicast group address from the multicast protocol packet;

generate a multicast forwarding table according to the multicast source address, the multicast group address, a multicast inbound interface, and a multicast outbound interface, where the multicast outbound interface includes an external interface of the core node and the virtual remote logical interface;

allocate a P2MP PW label to the multicast source address and the multicast group address; and search the multicast forwarding table for the external interface of the core node, search for an outbound interface of the multicast tree tunnel on the core node according to the multicast tree tunnel, and generate a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and a transmitter, configured to: after the processor generates the P2MP PW multicast forwarding table of the core node, send the P2MP PW multicast forwarding table of the core node to the core node, so that the core node forwards a multicast data packet according to the P2MP PW multicast forwarding table.

With reference to the fifth aspect, in a first possible implementation manner, the processor is further configured to:

search the multicast forwarding table for the virtual remote logical interface;

acquire the external interface of the remote node according to a mapping relationship between the virtual remote logical interface and the external interface of the remote node;

search for an outbound interface of the multicast tree tunnel on the remote node according to the multicast tree tunnel; and generate a P2MP PW multicast forwarding table of the remote node according to the external interface of the remote node, the outbound interface of the multicast tree tunnel on the remote node, and the P2MP PW label; and the transmitter is further configured to:

send the P2MP PW multicast forwarding table of the remote node to the remote node, so that the remote node forwards a multicast data packet according to the P2MP PW multicast forwarding table.

With reference to the fifth aspect, in a second possible implementation manner, the multicast inbound interface is an outbound interface that is corresponding to the multicast source address and in a preset unicast forwarding table searched according to the multicast source address.

With reference to the fifth aspect and the foregoing possible implementation manners, in a third possible implementation manner, the processor is specifically configured to:

when the multicast protocol packet is a protocol packet that is sent by the device outside the network virtualization system and received by the remote node, receive the multicast protocol packet transparently transmitted through a point-to-point pseudo wire P2P PW established between the core node and the remote node, and through a control channel between the core node and a controller; or when the multicast protocol packet is a protocol packet that is sent by the device outside the network virtualization system and received by the core node, receive the multicast protocol packet through a control channel between the core node and a controller.

According to a sixth aspect, an embodiment of the application provides a communications device, where the communications device is located in a network virtualization system, and the communications device includes:

a processor, configured to create, on the communications device, a virtual remote logical interface for an external interface of a remote node, where the external interface of the remote node is an interface used to connect to another network device;

generate a multicast tree tunnel that uses the communications device as a root;

obtain a multicast protocol packet, where the multicast protocol packet is a protocol packet sent by a device outside the network virtualization system by using the remote node or the communications device of the network virtualization system;

acquire a multicast source address and a multicast group address from the multicast protocol packet;

generate a multicast forwarding table according to the multicast source address, the multicast group address, a multicast inbound interface, and a multicast outbound interface, where the multicast outbound interface includes an external interface of the communications device and the virtual remote logical interface;

allocate a P2MP PW label to the multicast source address and the multicast group address; and search the multicast forwarding table for the external interface of the communications device, search for an outbound interface of the multicast tree tunnel on the communications device according to the multicast tree tunnel, and generate a point-to-multipoint pseudo wire P2MP PW multicast forwarding table of the communications device according to the multicast source address, the multicast group address, the P2MP PW label, the multicast inbound interface, the external interface of the communications device, and the outbound interface of the multicast tree tunnel on the communications device; and a memory, configured to save the P2MP PW multicast forwarding table of the communications device, so that the communications device forwards a multicast data packet according to the P2MP PW multicast forwarding table.

With reference to the sixth aspect, in a first possible implementation manner, the processor is further configured to:

search the multicast forwarding table for the virtual remote logical interface;

acquire the external interface of the remote node according to a mapping relationship between the virtual remote logical interface and the external interface of the remote node;

search for an outbound interface of the multicast tree tunnel on the remote node according to the multicast tree tunnel; and generate a P2MP PW multicast forwarding table of the remote node according to the external interface of the remote node, the outbound interface of the multicast tree tunnel on the remote node, and the P2MP PW label; and the communications device further includes a transmitter, where the transmitter is configured to send the P2MP PW multicast forwarding table of the remote node to the remote node, so that the remote node forwards a multicast data packet according to the P2MP PW multicast forwarding table.

With reference to the sixth aspect, in a second possible implementation manner, the multicast inbound interface is an outbound interface that is corresponding to the multicast source address and in a preset unicast forwarding table searched according to the multicast source address.

With reference to the sixth aspect and the foregoing possible implementation manners, in a third possible implementation manner, the processor is specifically configured to:

when the multicast protocol packet is a protocol packet that is sent by the device outside the network virtualization system and received by the remote node, receive the multicast protocol packet transparently transmitted through a point-to-point pseudo wire P2P PW established between the communications device and the remote node, and through a control channel between the communications device and a controller.

According to a seventh aspect, an embodiment of the application provides a method for sending a multicast data packet, including:

if a core node receives a multicast data packet, searching, by the core node, a P2MP PW multicast forwarding table of the core node according to the multicast data packet; and if it is determined that a forwarding outbound interface of the multicast data packet is an external interface of the core node, sending, by the core node, the multicast data packet directly through the external interface of the core node.

With reference to the seventh aspect, in a first possible implementation manner, the method further includes:

if it is determined that the forwarding outbound interface of the multicast data packet is an internal outbound interface of the core node, encapsulating, by the core node, a P2MP PW label and a label of a multicast tree tunnel into the multicast data packet, to obtain a first multicast data packet; and sending the first multicast data packet through the internal outbound interface of the core node, where the internal outbound interface of the core node is an outbound interface of the multicast tree tunnel on the core node.

With reference to the seventh aspect and the first possible implementation manner, in a second possible implementation manner, the method further includes:

receiving, by an intermediate remote node, the first multicast data packet, acquiring the P2MP PW label from the first multicast data packet, searching a P2MP PW multicast forwarding table of the intermediate remote node according to the P2MP PW label, and acquiring a matching multicast forwarding outbound interface;

if the matching multicast forwarding outbound interface is an outbound interface of the multicast tree tunnel on the intermediate remote node, swapping, by the intermediate remote node, an incoming label and an outgoing label in the label of the multicast tree tunnel according to the first multicast data packet, to obtain a second multicast data packet; and sending, by the intermediate remote node, the second multicast data packet through the outbound interface of the multicast tree tunnel on the intermediate remote node.

With reference to the seventh aspect and the second possible implementation manner, in a third possible implementation manner, the method further includes:

if the matching multicast forwarding outbound interface is an external interface of the intermediate remote node, sending, by the intermediate remote node, the first multicast data packet directly through the external interface of the intermediate remote node.

With reference to the seventh aspect and the third possible implementation manner, in a fourth possible implementation manner, the method further includes:

if a remote node receives the second multicast data packet, acquiring the P2MP PW label from the second multicast data packet, searching a P2MP PW multicast forwarding table of the remote node according to the P2MP PW label, and acquiring a matching multicast forwarding outbound interface;

decapsulating, by the remote node, the label of the multicast tree tunnel and the P2MP PW label that are in the second multicast data packet, to obtain a third multicast data packet; and sending, by the remote node, the third multicast data packet through the matching multicast forwarding outbound interface.

According to an eighth aspect, an embodiment of the application further provides a network virtualization system, including a core node, an intermediate remote node connected to the core node, and a remote node connected to the intermediate remote node, where the core node is specifically configured to:

receive a multicast data packet, and search a point-to-multipoint pseudo wire P2MP PW multicast forwarding table of the core node according to the multicast data packet;

if it is determined that a forwarding outbound interface of the multicast data packet is an internal outbound interface of the core node, encapsulate, by the core node, a P2MP PW label and a label of a multicast tree tunnel into the multicast data packet, to obtain a first multicast data packet; and send the first multicast data packet to the intermediate remote node through the internal outbound interface of the core node, where the internal outbound interface of the core node is an outbound interface of the multicast tree tunnel on the core node;

the intermediate remote node is specifically configured to:

receive the first multicast data packet, acquire the P2MP PW label from the first multicast data packet, search a P2MP PW multicast forwarding table of the intermediate remote node according to the P2MP PW label, and acquire a matching multicast forwarding outbound interface;

if the matching multicast forwarding outbound interface is an outbound interface of the multicast tree tunnel on the intermediate remote node, swap, by the intermediate remote node, an incoming label and an outgoing label in the label of the multicast tree tunnel according to the first multicast data packet, to obtain a second multicast data packet; and send, by the intermediate remote node, the second multicast data packet through the outbound interface of the multicast tree tunnel on the intermediate remote node; and if the matching multicast forwarding outbound interface is an external interface of the intermediate remote node, send, by the intermediate remote node, the first multicast data packet to the remote node directly through the external interface of the intermediate remote node; and the remote node is specifically configured to:

receive the second multicast data packet, acquire the P2MP PW label from the second multicast data packet, search a P2MP PW multicast forwarding table of the remote node according to the P2MP PW label, and acquire a matching multicast forwarding outbound interface;

decapsulate, by the remote node, the label of the multicast tree tunnel and the P2MP PW label that are in the second multicast data packet, to obtain a third multicast data packet; and send, by the remote node, the third multicast data packet through the matching multicast forwarding outbound interface.

With reference to the eighth aspect, in a first possible implementation manner, the core node is further configured to:

if it is determined that the forwarding outbound interface of the multicast data packet is an external interface of the core node, send, by the core node, the multicast data packet directly through the external interface of the core node.

It may be know from the foregoing technical solutions that, in the method and the device for establishing a multicast data channel in a network virtualization system in the embodiments of the application, when a controller serves as an independent device in the network virtualization system, and after a virtual remote logical interface for an external interface of a remote node is created on the controller, the controller generates a multicast tree tunnel that uses a core node as a root, obtains a multicast protocol packet sent by a device outside the network virtualization system, acquires a multicast source address and a multicast group address from the multicast protocol packet; and generates a multicast forwarding table according to the multicast source address, the multicast group address, a multicast inbound interface, and a multicast outbound interface; the controller allocates a P2MP PW label to the multicast source address and the multicast group address; searches the multicast forwarding table for an external interface of the core node, finds an outbound interface of the multicast tree tunnel on the core node according to the multicast tree tunnel, and generates a P2MP PW multicast forwarding table of the core node on an outbound interface of the core node according to the multicast source address, the multicast group address, the P2MP PW label, the multicast inbound interface, the external interface of the core node, and the multicast tree tunnel; and sends the P2MP PW multicast forwarding table of the core node to the core node, so that the core node forwards a multicast data packet according to the P2MP PW multicast forwarding table. In this way, the network virtualization system can support a multicast service, thereby resolving a problem in the prior art that a cluster router cannot implement a multicast service.

BRIEF DESCRIPTION OF THE DRAWINGS

To describe the technical solutions in the embodiments of the application more clearly, the following briefly introduces the accompanying drawings required for describing the embodiments. Apparently, the accompanying drawings in the following description show some embodiments of the application, and persons of ordinary skill in the art may still derive other drawings from these accompanying drawings without creative efforts.

DETAILED DESCRIPTION

To make the objectives, technical solutions, and advantages of the application clearer, the following clearly describes the technical solutions of the application with reference to the accompanying drawings in the embodiments of the application. Apparently, the following described embodiments are a part of the embodiments of the application. Based on the embodiments of the application, persons of ordinary skill in the art can obtain other embodiments that can resolve the technical problem of the application and implement the technical effect of the application by equivalently altering some or all the technical features even without creative efforts. Apparently, the embodiments obtained by means of alteration do not depart from the scope disclosed in the application.

Currently, a cluster router is also referred to as a multi-chassis router, for which multiple high-end routers are connected in a certain manner and by using a multi-chassis hardware cluster technology (that is, a multi-level fully switched network technology), to jointly form a multi-level and multi-plane switch matrix system, so that the multiple high-end routers can work cooperatively, and present as one logical router, thereby overcoming limitations of a single chassis on aspects such as a switching capacity, power consumption, and heat dissipation, and smoothly expanding into a cluster routing system with a larger capacity.

Figure 1A:
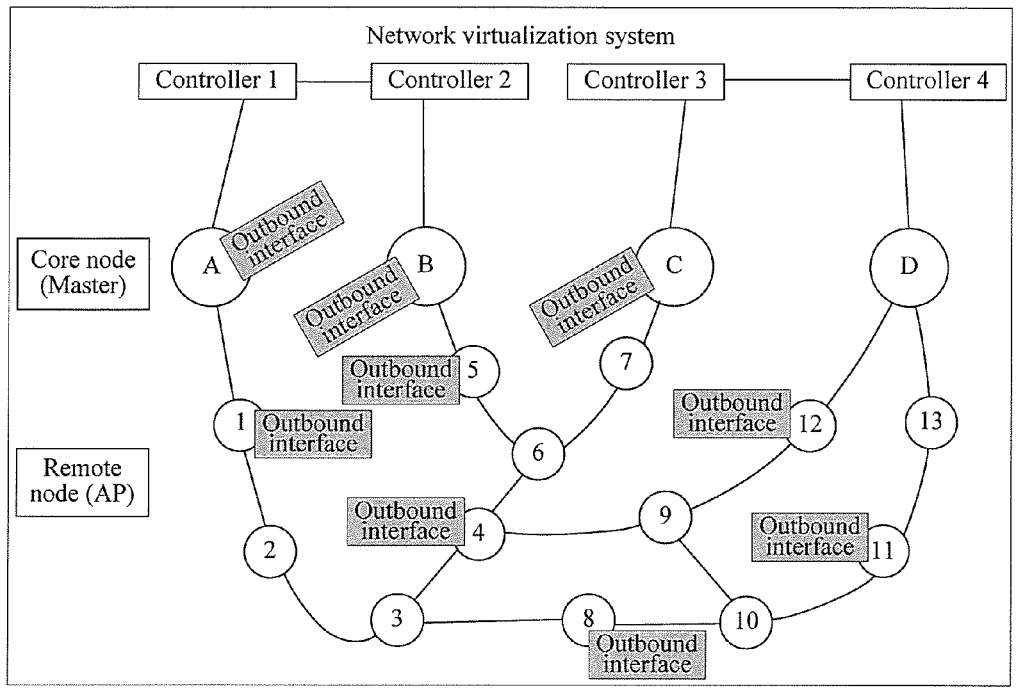
FIG. 1A to FIG. 1C are architectural diagrams of a network virtualization system according to the application.
Figure 1B:
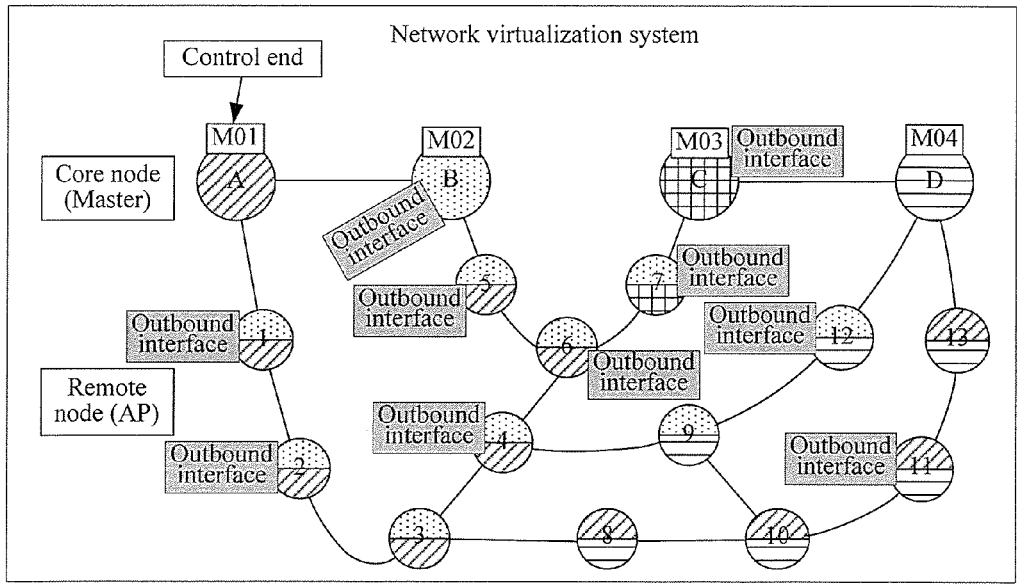
Figure 1C:
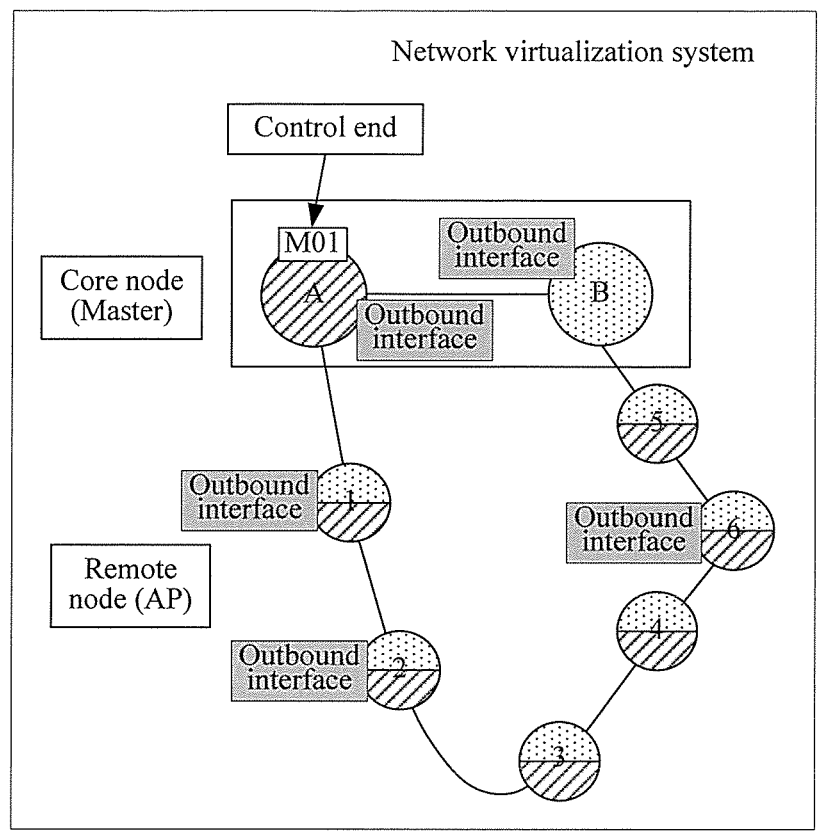

A network virtualization system described in the embodiments of the application may be the foregoing cluster routing system, or may be another network virtualization system that includes a remote node and a core node, as shown in FIG. 1A to FIG. 1C.

FIG. 1A shows an architectural diagram of a network virtualization system. In FIG. 1A, the network virtualization system includes: a core node, a remote node, and a controller. The controller independently serves as a control device in the network virtualization system, and the core node and the remote node only serve as forwarding devices in the network virtualization system. FIG. 1B and FIG. 1C each shows an architectural diagram of another network virtualization system. In FIG. 1B and FIG. 1C, the network virtualization system includes: a core node and a remote node. In this case, the controller is located in the core node and belongs to a unit/module in the core node. Correspondingly, the core node may serve as a control device in the network virtualization system, and may also serve as a forwarding device in the network virtualization system, and the remote node only serves as a forwarding device in the network virtualization system.

The core node, the remote node, and the controller in the foregoing FIG. 1A to FIG. 1C may be devices such as routers or switches. Generally, when the core node and the remote node only serve as forwarding devices, the core node and the remote node may be low-performance routers or switches, and the controller may be a high-performance router or switch. In addition, the network virtualization system mentioned in the embodiments of the application is a system whose control function and forwarding function are separated, and in an initial establishment stage of the network virtualization system, a channel for transmitting a control packet, that is, a control channel, is established between the control device and the forwarding device in the network virtualization system.

Particularly, after the network virtualization system is established, establishment of a multicast tree tunnel is completed accordingly. The multicast tree tunnel of the network virtualization system is a multicast tree tunnel established by using a core node as a root and all remote nodes as leaves. Methods in the embodiments of the application are methods implemented based on a network virtualization system after a multicast tree tunnel is established.

Specifically, FIG. 1B shows an architectural diagram of a network virtualization system in a dual control scenario, and FIG. 1C shows an architectural diagram of a network virtualization system in a single control scenario.

For example, in FIG. 1B, a network virtualization system in a dual control scenario includes four core nodes (core nodes A, B, C and D) and 13 remote nodes, and a controller of the network virtualization system is located in a core node.

The controller of the network virtualization system is located in the core node, and further forms a control end in the core node. In specific application, the network virtualization system may have a primary control end and a secondary control end, where the primary control end may be integrated in the core node A, or may be parasitic in the core node A; and the secondary control end is integrated in the core node B, or is parasitic in the core node B. In addition, an actual network virtualization system may include multiple primary control ends and multiple secondary control ends, for example, another primary control end may further be integrated in the core node C, and another secondary control end may further be integrated in the core node D.

Generally, the network virtualization system in a dual control scenario refers to that each remote node such as a wireless access point (Access Point, AP for short) may be controlled by control ends of two core nodes (for example, the core node A and the core node B), that is, both the primary control end (for example, the core node A) and the secondary control end (for example, the core node B) control the remote nodes (for example, the remote nodes 1, 2, 3, 4, 5 and 6).

FIG. 1C shows an architectural diagram of a network virtualization system in a single control scenario. From the perspective of a control layer, two core nodes (for example, the core node A and the core node B) may be virtualized into one core node first, that is, the two core nodes share one primary control end, and each remote node (for example, the remote node 1, 2, 3, 4, 5 or 6) is controlled by only one control end, that is, the primary control end and the secondary control end serve as only one control device.

The embodiments of the application describe a method for establishing a multicast data channel in a network virtualization system by using the foregoing FIG. 1A to FIG. 1C as examples.

Figure 2:
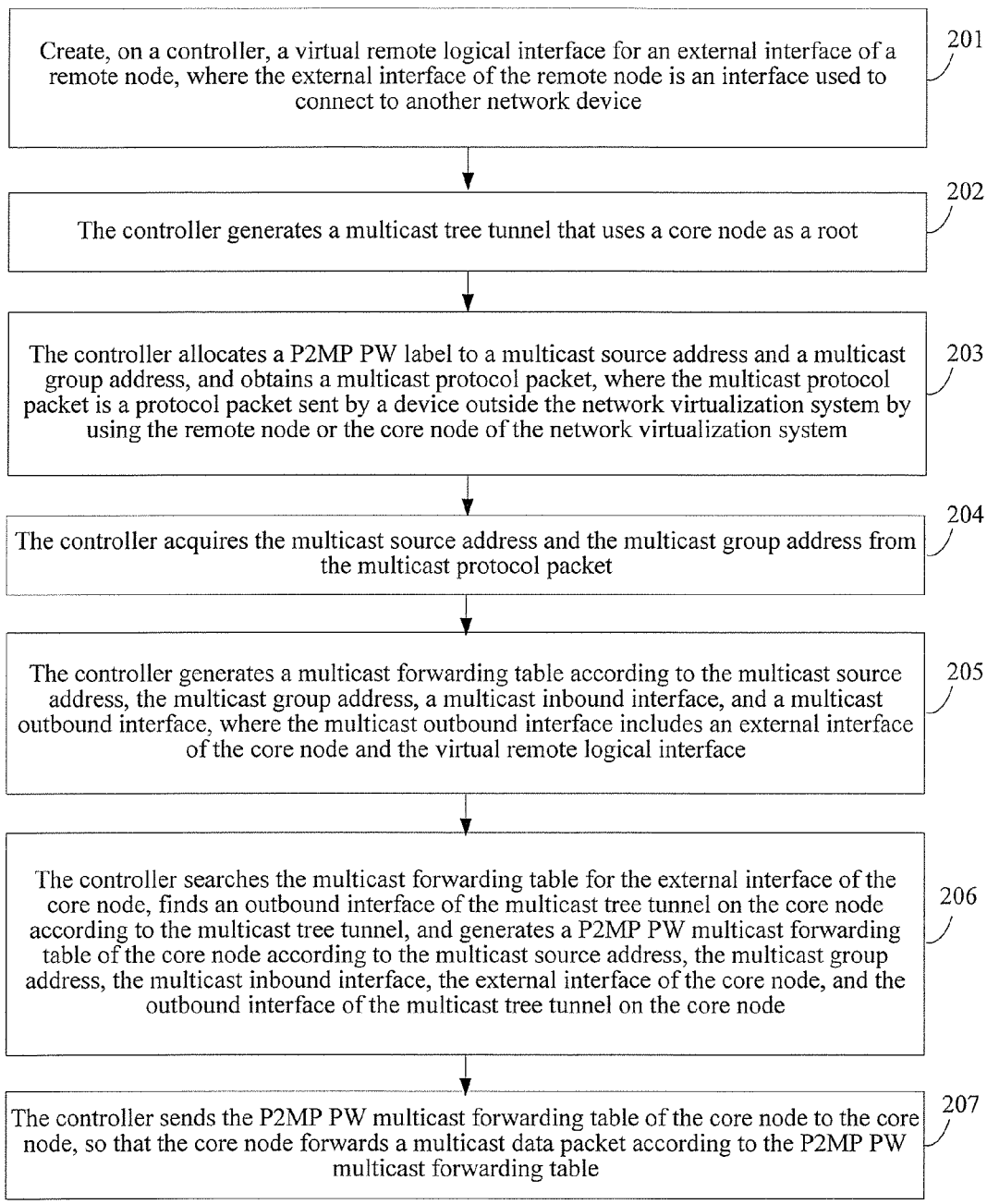
FIG. 2 is a schematic flowchart of a method for establishing a multicast data channel in a network virtualization system according to an embodiment of the application.

FIG. 2 shows a schematic flowchart of a method for establishing a multicast data channel in a network virtualization system according to an embodiment of the application. With reference to FIG. 1A and FIG. 2, the method for establishing a multicast data channel in a network virtualization system in this embodiment is described as follows:

In this embodiment, a network virtualization system is established in advance, and after the establishment of the network virtualization system is completed, the network virtualization system has a P2MP TE (full name in English: Point-To-Multipoint Traffic Engineering) multicast tree tunnel, where the P2MP TE multicast tree tunnel may be understood as a multicast tree tunnel that uses a core node as a root and all remote nodes as leaves. Each core node is corresponding to one P2MP TE multicast tree tunnel.

For example, the network virtualization system may be a P2MP TE multicast tree tunnel that is established by using each core node (Master) as a root, and all remote nodes (APs) in the network virtualization system as leaves.

In another embodiment, the multicast tree tunnel may be a Resource Reservation Protocol-Traffic Engineering (full name in English: Resource Reservation Protocol-Traffic Engineering, RSVP-TE for short) multicast tree tunnel, a point-to-multipoint label switching path (full name in English: P2MP Label Switching Path, P2MP LSP for short) multicast tree tunnel of multipoint extensions for Label Distribution Protocol (full name in English: multipoint extensions for Label Distribution Protocol, mLDP for short), or another P2MP tunnel.

In addition, in a dual control scenario, the number of multicast trees to be established depends on the number of the core nodes. In a single control scenario, the network virtualization system may be two P2MP TE multicast tree tunnels that are established by using a primary core node (Master) and a secondary core node (Master) as a root and all remote nodes (APs) as leaves.

201: Create, on a controller, a virtual remote logical interface for an external interface of a remote node, where the external interface of the remote node is an interface used to connect to another network device.

The external interface in this embodiment refers to an interface that connects to a network device outside the network virtualization system. The virtual remote logical interface may be a virtual remote logical interface with a multicast function.

202: The controller generates a multicast tree tunnel that uses a core node as a root.

203: The controller obtains a multicast protocol packet, where the multicast protocol packet is a protocol packet sent by the device outside the network virtualization system by using the remote node or the core node of the network virtualization system.

For example, the multicast protocol packet may be an Internet Group Management Protocol (full name in English: Internet Group Management Protocol, IGMP for short) packet, or may be a PIM (full name in English: Protocol Independent Multicast) packet.

It should be understood that, the multicast protocol packet herein may be a multicast protocol packet sent by a user equipment and used to configure the network virtualization system.

204: The controller acquires a multicast source address and a multicast group address from the multicast protocol packet.

205: The controller generates a multicast forwarding table according to the multicast source address, the multicast group address, a multicast inbound interface, and a multicast outbound interface, where the multicast outbound interface includes an external interface of the core node and the virtual remote logical interface.

For example, the multicast inbound interface may be an outbound interface that is corresponding to the multicast source address and in a preset unicast forwarding table searched according to the multicast source address. The unicast forwarding table herein is a forwarding table generated by using an Internet address (full name in English: Internet Protocol, IP for short) routing protocol, which is commonly known.

206: The controller allocates a P2MP PW label to the multicast source address and the multicast group address; and the controller searches the multicast forwarding table for the external interface of the core node, finds an outbound interface of the multicast tree tunnel on the core node according to the multicast tree tunnel, and generates a P2MP PW multicast forwarding table of the core node according to the multicast source address, the multicast group address, the P2MP PW label, the multicast inbound interface, the external interface of the core node, and the outbound interface of the multicast tree tunnel on the core node.

207: The controller sends the point-to-multipoint pseudo wire (full name in English: Point-To-Multipoint Pseudo Wire, P2MP PW for short) multicast forwarding table of the core node to the core node, so that the core node forwards a multicast data packet according to the P2MP PW multicast forwarding table.

For example, the controller sends the P2MP PW multicast forwarding table of the core node to the core node through a control channel of the network virtualization system.

The control channel is a channel for transmitting a control management packet between the control device and a forwarding device when the network virtualization system is established.

In an optional application scenario, that "the controller obtains a multicast protocol packet" in the foregoing step 203 may specifically include:

2031: If the multicast protocol packet is a protocol packet that is sent by the device outside the network virtualization system and received by the remote node, the controller receives the multicast protocol packet transparently transmitted through a point-to-point pseudo wire P2P PW established between the core node and the remote node, and through a control channel between the core node and the controller; or

2031': if the multicast protocol packet is a protocol packet that is sent by the device outside the network virtualization system and received by the core node, the controller receives the multicast protocol packet through a control channel between the core node and the controller.

It may be known from the foregoing embodiment that, in the method for establishing a multicast data channel in a network virtualization system in this embodiment, when a controller serves as an independent control device in the network virtualization system, the controller may generate a P2MP PW multicast forwarding table of a core node, and the controller may send the P2MP PW multicast forwarding table of the core node to the core node, so that the core node forwards a multicast data packet according to the P2MP PW multicast forwarding table. In this way, the network virtualization system can support a multicast service, thereby resolving a problem in the prior art that a cluster router cannot implement a multicast service.

In an optional implementation scenario, the foregoing method for establishing a multicast data channel in a network virtualization system may further include the following step 208 to step 213, which are not shown in the figure.

208: The controller searches the multicast forwarding table for the virtual remote logical interface.

209: The controller acquires the external interface of the remote node according to a mapping relationship between the virtual remote logical interface and the external interface of the remote node.

210: The controller finds an outbound interface of the multicast tree tunnel on the remote node according to the multicast tree tunnel.

211: The controller generates a P2MP PW multicast forwarding table of the remote node according to the external interface of the remote node, the outbound interface of the multicast tree tunnel on the remote node, and the P2MP PW label.

For example, a label allocation and management unit of the network virtualization system may allocate a P2MP PW label to each P2MP PW multicast tree, and manage the P2MP PW label, for example, maintain a mapping relationship between (S, G) and a P2MP label (label), a MID (multicast ID, full name in English: Multicast Identification), and OutIntf.

(S, G) is obtained from a multicast protocol packet, where S represents a multicast source address, and G represents a multicast group address such as an Internet protocol (full name in English: Internet Protocol, IP for short) address; and OutIntf represents outbound interface information.

The foregoing label allocation and management unit may be an independent device in the network virtualization system, or may be parasitic in a controller in the network virtualization system. The foregoing P2MP PW multicast tree is a P2MP PW multicast tree that uses a core node as a root and some or all remote nodes corresponding to an outbound interface in OutIntf as leaves.

212: The controller sends the P2MP PW multicast forwarding table of the remote node to the remote node, so that the remote node forwards a multicast data packet according to the P2MP PW multicast forwarding table.

For example, the controller sends, through a control channel of the network virtualization system, the P2MP PW multicast forwarding table of the remote node to the remote node corresponding to the virtual remote logical interface.

The control channel is a channel for transmitting a control management packet between the control device and a forwarding device when the network virtualization system is established.

It may be known from the foregoing that, in the method for establishing a multicast data channel in a network virtualization system in this embodiment, when a controller serves as an independent control device in the network virtualization system, the controller may generate a P2MP PW multicast forwarding table of a remote node, and the controller may send the P2MP PW multicast forwarding table of the remote node to the remote node, so that the remote node forwards a multicast data packet according to the P2MP PW multicast forwarding table of the remote node. In this way, the network virtualization system can support a multicast service, thereby resolving a problem in the prior art that a cluster router cannot implement a multicast service.

In addition, on the basis of the embodiment shown in FIG. 2, the foregoing step 205 may be specifically analyzed as follows:

For example, in step 204, the controller acquires a multicast source address (S) and a multicast group address (G) from the multicast protocol packet, and the controller may also acquire an inbound interface (InIntf) from a preset unicast forwarding table.

In this case, in step 205, the controller forms an outbound interface (OutIntf) by using an outbound interface of the core node according to a mapping relationship between the virtual remote logical interface and the external interface of the remote node.

That is, the controller generates information about an outbound interface list including the virtual remote logical interface that has a mapping relationship with the external interface of the remote node, and the outbound interface of the core node.

Then, the multicast forwarding table {(S, G); InIntf; OutIntf} is generated according to the multicast source address, the multicast group address, the multicast inbound interface, and the multicast outbound interface.

In the method for establishing a multicast data channel in this embodiment, after a network virtualization system is established, a service connection between nodes in the network virtualization system is implemented through an internal data transmission channel, and further, continuity of a multicast service in the network virtualization system is achieved, so that the network virtualization system can support forwarding of a multicast data packet with high efficiency and quality.

In an exemplary embodiment, the multicast forwarding table may be {(S, G); InIntf; OutIntf}.

(S, G) is obtained from a multicast protocol packet, where S represents a multicast source address, and G represents a multicast group address.

In another exemplary embodiment, the foregoing multicast forwarding table may include a tunnel identifier, that is, a virtual private network identification (Virtual Private Network Identification, VPNID for short). For example, the multicast forwarding table may be {VPNID+(S, G); InIntf; OutIntf}.

Figure 3:
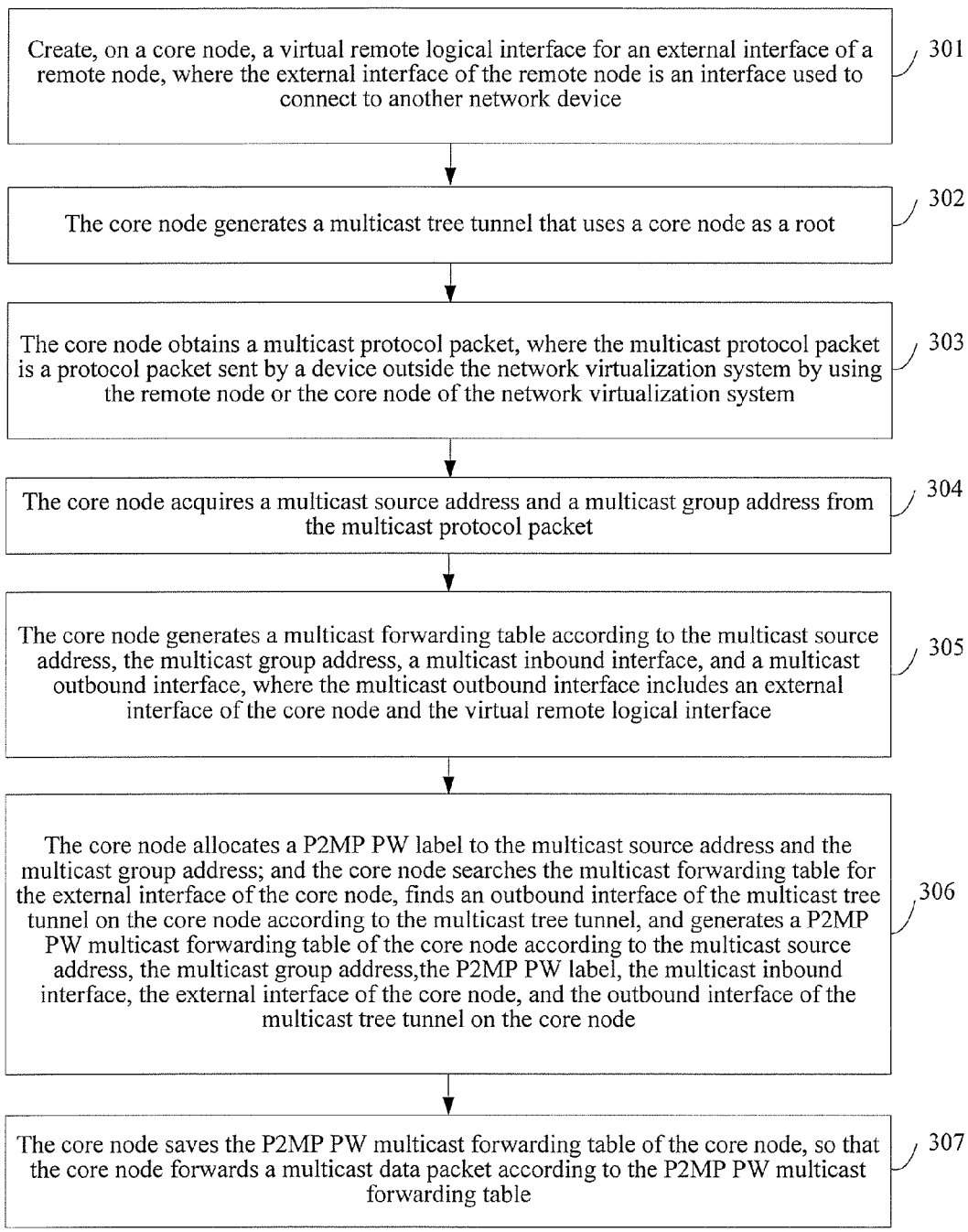
FIG. 3 is a schematic flowchart of a method for establishing a multicast data channel in a network virtualization system according to another embodiment of the application.

FIG. 3 shows a schematic flowchart of a method for establishing a multicast data channel in a network virtualization system according to an embodiment of the application. With reference to FIG. 1B, FIG. 1C, and FIG. 3, the method for establishing a multicast data channel in a network virtualization system in this embodiment is described as follows:

In this embodiment, a network virtualization system is established in advance, and after the establishment of the network virtualization system is completed, the network virtualization system has a P2MP TE multicast tree tunnel, where the P2MP TE multicast tree tunnel herein may be understood as a multicast tree tunnel that uses a core node as a root and all remote nodes as leaves. Each core node is corresponding to one P2MP TE multicast tree tunnel.

For example, the network virtualization system may be a P2MP TE multicast tree tunnel that is established by using each core node (Master) as a root and all remote nodes (APs) in the network virtualization system as leaves.

In a dual control scenario, the number of multicast trees to be established depends on the number of the core nodes. In a single control scenario, the network virtualization system may be two P2MP TE multicast tree tunnels that are established by using a primary core node (Master) and a secondary core node (Master) as a root and all remote nodes (APs) as leaves.

301: Create, on a core node, a virtual remote logical interface for an external interface of a remote node, where the external interface of the remote node is an interface used to connect to another network device.

302: The core node generates a multicast tree tunnel that uses a core node as a root.

303: The core node obtains a multicast protocol packet, where the multicast protocol packet is a protocol packet sent by a device outside the network virtualization system by using the remote node or the core node of the network virtualization system.

It should be understood that, the multicast protocol packet herein may be a multicast protocol packet sent by a user equipment and used to configure the network virtualization system.

304: The core node acquires a multicast source address and a multicast group address from the multicast protocol packet.

305: The core node generates a multicast forwarding table according to the multicast source address, the multicast group address, a multicast inbound interface, and a multicast outbound interface, where the multicast outbound interface includes an external interface of the core node and the virtual remote logical interface.

For example, the foregoing multicast inbound interface may be an outbound interface that is corresponding to the multicast source address and in a preset unicast forwarding table searched according to the multicast source address.

306: The core node allocates a P2MP PW label to the multicast source address and the multicast group address; and the core node searches the multicast forwarding table for the external interface of the core node, finds an outbound interface of the multicast tree tunnel on the core node according to the multicast tree tunnel, and generates a P2MP PW multicast forwarding table of the core node according to the multicast source address, the multicast group address, the P2MP PW label, the multicast inbound interface, the external interface of the core node, and the outbound interface of the multicast tree tunnel on the core node.

For example, the P2MP PW multicast forwarding table of the core node may be: {(S, G); InIntf; OutIntf of the core node}.

(S, G) is obtained from a multicast protocol packet, where S represents a multicast source address, and G represents a multicast group address; and InIntf represents a multicast inbound interface, and OutIntf of the core node represents information about a list including the external interface of the core node and the outbound interface of the multicast tree tunnel on the core node.

307: The core node saves the P2MP PW multicast forwarding table of the core node, so that the core node forwards a multicast data packet according to the P2MP PW multicast forwarding table.

In a specific implementation scenario, that "the core node obtains a multicast protocol packet" in the foregoing step 303 may specifically include:

3031: If the multicast protocol packet is a protocol packet that is sent by the device outside the network virtualization system and received by the remote node, the core node receives the multicast protocol packet transparently transmitted through a point-to-point pseudo wire (full name in English: Point-To-Point Pseudo Wire, P2P PW for short) established between the core node and the remote node, and through a control channel between the core node and a controller.

That is, if the core node is a control device, and the multicast protocol packet is a protocol packet that is sent by the device outside the network virtualization system and received by the remote node, the core node receives the multicast protocol packet transparently transmitted through the P2P PW established between the core node and the remote node, and through the control channel between the core node and the controller.

If the core node is a control device, and the multicast protocol packet is a protocol packet that is sent by the device outside the network virtualization system and received by the core node, the core node directly receives the multicast protocol packet.

It may be known from the foregoing embodiment that, in the method for establishing a multicast data channel in a network virtualization system in this embodiment, when a controller is located inside a core node in the network virtualization system, the core node may generate a P2MP PW multicast forwarding table of the core node, and further save the P2MP PW multicast forwarding table of the core node, so that the core node forwards a multicast data packet according to the P2MP PW multicast forwarding table. In this way, the network virtualization system can support a multicast service, thereby resolving a problem in the prior art that a cluster router cannot implement a multicast service.

In an optional implementation scenario, the foregoing method for establishing a multicast data channel in a network virtualization system may further include the following step 308 to step 313, which are not shown in the figure.

308: The core node searches the multicast forwarding table for the virtual remote logical interface.

309: The core node acquires the external interface of the remote node according to a mapping relationship between the virtual remote logical interface and the external interface of the remote node.

310: The core node finds an outbound interface of the multicast tree tunnel on the remote node according to the multicast tree tunnel.

311: The core node generates a P2MP PW multicast forwarding table of the remote node according to the external interface of the remote node, the outbound interface of the multicast tree tunnel on the remote node, and the P2MP PW label.

For example, the P2MP PW multicast forwarding table of the remote node may be {P2MP PW label; OutIntf of the remote node}.

OutIntf of the remote node represents information about a list including the external interface of the remote node and the outbound interface of the multicast tree tunnel on the remote node.

In addition, in a single control scenario, a control end uniformly allocates two P2MP PW labels to each (S, G), and generates two P2MP PW multicast forwarding tables, which are a primary P2MP PW multicast forwarding table that uses a primary core node as a root, and a secondary P2MP PW multicast forwarding table that uses a secondary core node as a root, respectively.

312: The core node sends the P2MP PW multicast forwarding table of the remote node to the remote node, so that the remote node forwards a multicast data packet according to the P2MP PW multicast forwarding table.

It may be known from the foregoing that, in the method for establishing a multicast data channel in a network virtualization system in this embodiment, when a controller is located in a core node in the network virtualization system, the core node may generate a P2MP PW multicast forwarding table of a remote node, and further send the P2MP PW multicast forwarding table of the remote node to the remote node, so that the remote node forwards a multicast data packet according to the P2MP PW multicast forwarding table. In this way, the network virtualization system can support a multicast service, thereby resolving a problem in the prior art that a cluster router cannot implement a multicast service.

In addition, with reference to FIG. 1B, if a primary control end is in the core node A, and a secondary control end is in the core node B, and when the core node that obtains the multicast protocol packet in the foregoing step 303 is the core node A, the core node A further needs to back up the obtained multicast protocol packet into the core node B.

Alternatively, in a possible implementation manner, if the core node that obtains the multicast protocol packet in the foregoing step 303 is the core node B, the core node B further needs to send the obtained multicast protocol packet to the core node A through a control channel between the core node A and the core node B.

The foregoing multicast protocol packet is a protocol packet sent by the device outside the network virtualization system by using the remote node or the core node of the network virtualization system.

In actual application, as shown in FIG. 1B, protocol synchronization is performed between a core node in which a primary control end is located and a core node in which a secondary control end is located. For example, the multicast protocol packet is transparently transmitted to the primary control end through a P2P PW between the remote node and the core node in which the primary control end is located, and the primary control end synchronizes, through a control channel between the core node in which the primary control end is located and the core node in which the secondary control end is located, the multicast protocol packet to a control end of the core node in which the secondary control end is located.

The control channel between the core node in which the primary control end is located and the core node in which the secondary control end is located is a control channel that is established once a network system is established.

Certainly, in an architectural diagram of a network virtualization system shown in FIG. 1C, because the primary control end and the secondary control end are located in a same core node, the foregoing step of backing up the multicast protocol packet is not needed.

It should be noted that, in a dual control scenario, a multicast data channel needs to be established for each core node with a control end, that is, a process from step 301 to step 307 is repeated to obtain a P2MP PW multicast forwarding table of each core node, so that the core node forwards a multicast data packet according to the P2MP PW multicast forwarding table.

In addition, during a specific application process, if a multicast data channel of each core node in a network virtualization system in a dual control scenario has already been established, a multicast tree receives a multicast data packet at a core node with a primary control end, and transmits the multicast data packet to a core node with a secondary control end for backup. When the multicast data packet of the core node with the primary control end has already been sent through an interface of a multicast tree tunnel or an outbound interface of the core node, or when the multicast data packet has already been delivered to a remote node, the multicast data packet backed up at the core node with the secondary control end is discarded, and otherwise, the backed up multicast data packet is used for subsequent forwarding.

Figure 4:
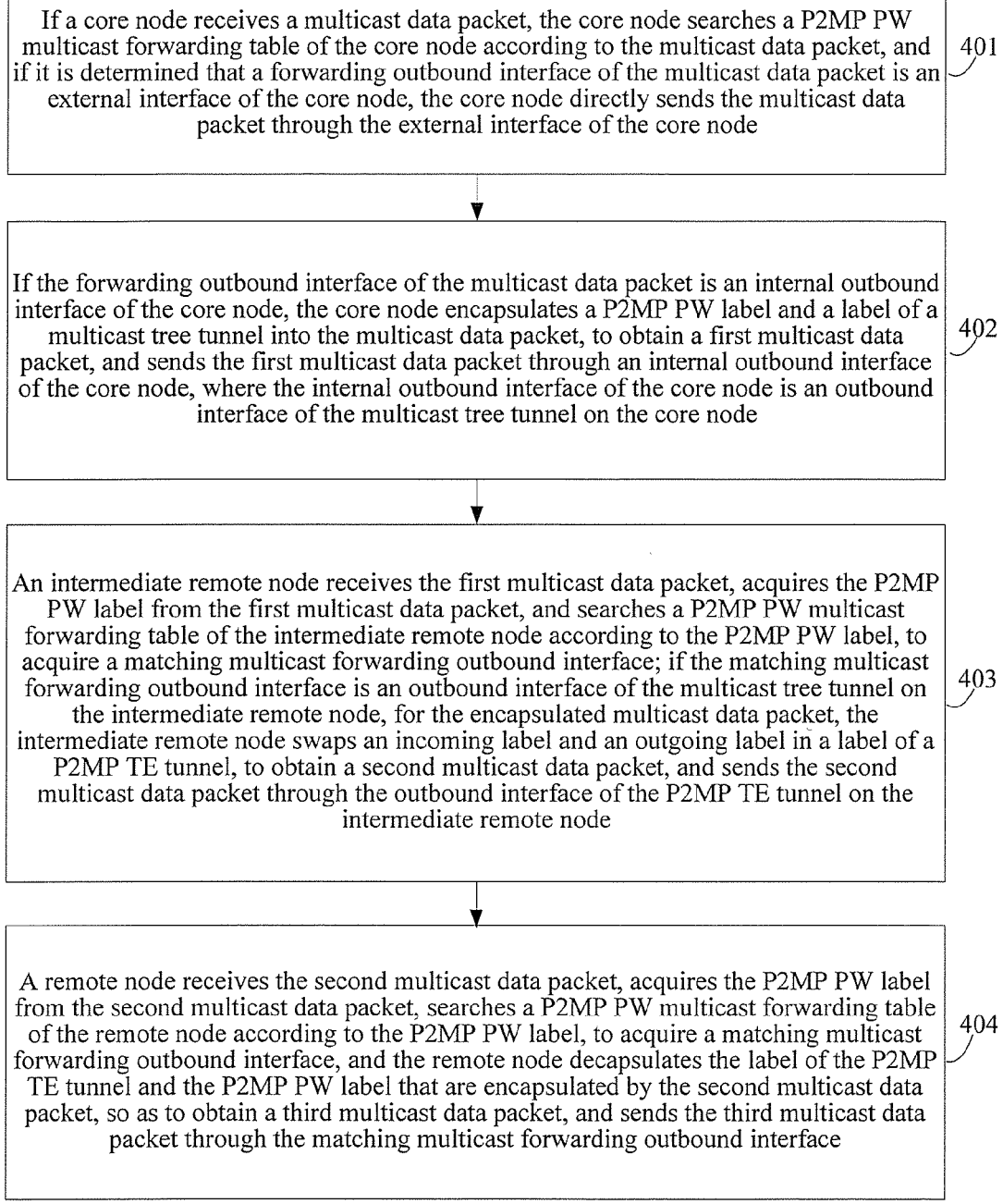
FIG. 4 is a schematic flowchart of a method for sending a multicast data packet according to another embodiment of the application.

FIG. 4 shows a schematic flowchart of a method for sending a multicast data packet according to an embodiment of the application. As shown in FIG. 4, the method for sending a multicast data packet in this embodiment is described as follows:

401: If a core node receives a multicast data packet, the core node searches a P2MP PW multicast forwarding table of the core node according to the multicast data packet, and if it is determined that a forwarding outbound interface of the multicast data packet is an external interface of the core node, the core node directly sends the multicast data packet through the external interface of the core node.

402: If it is determined that the forwarding outbound interface of the multicast data packet is an internal outbound interface of the core node, the core node encapsulates a P2MP PW label and a label of a multicast tree tunnel into the multicast data packet, to obtain a first multicast data packet, and sends the first multicast data packet through the internal outbound interface of the core node.

The internal outbound interface of the core node is an outbound interface of the multicast tree tunnel on the core node.

403: An intermediate remote node receives the first multicast data packet, acquires the P2MP PW label from the first multicast data packet, searches a P2MP PW multicast forwarding table of the intermediate remote node according to the P2MP PW label, and acquires a matching multicast forwarding outbound interface; and if the matching multicast forwarding outbound interface is an outbound interface of the multicast tree tunnel (such as a P2MP TE tunnel) on the intermediate remote node, for the encapsulated multicast data packet, the intermediate remote node swaps an incoming label and an outgoing label in a label of the P2MP TE tunnel, to obtain a second multicast data packet, and sends the second multicast data packet through the outbound interface of the P2MP TE tunnel on the intermediate remote node.

If the matching multicast forwarding outbound interface is an external interface of the intermediate remote node, the intermediate remote node sends the first multicast data packet directly through the external interface of the intermediate remote node.

For example, in FIG. 1B, when a remote node 1 between a core node A and a node 2 is an intermediate remote node, the node 2 is a remote node.

404: A remote node receives the second multicast data packet, acquires the P2MP PW label from the second multicast data packet, searches a P2MP PW multicast forwarding table of the remote node according to the P2MP PW label, and acquires a matching multicast forwarding outbound interface; and the remote node decapsulates the label of the P2MP TE tunnel and the P2MP PW label that are in the second multicast data packet, to obtain a third multicast data packet, and sends the third multicast data packet through the matching multicast forwarding outbound interface.

Generally, the matching multicast forwarding outbound interface is an external interface of the remote node.

The foregoing method for sending a multicast data packet may enable a core node, an intermediate remote node, and a remote node in a network virtualization system to implement a multicast service.

Figure 5:
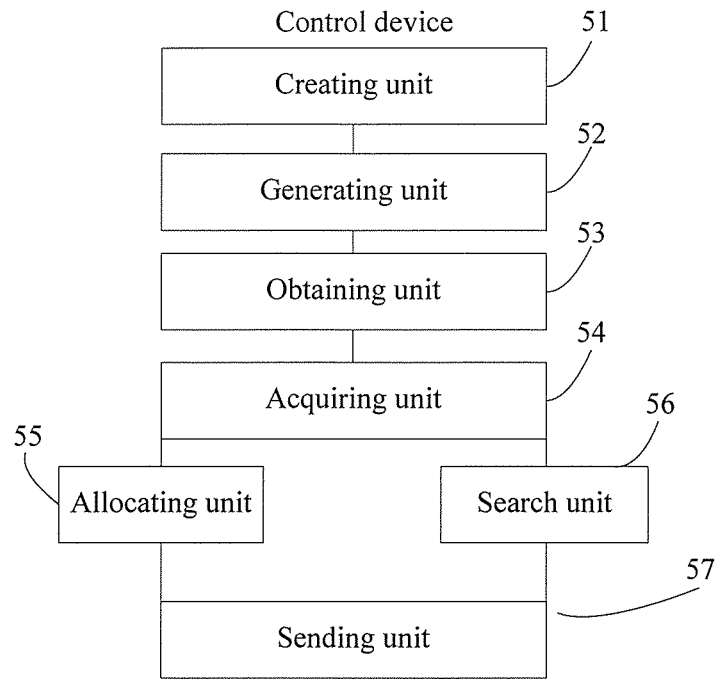
FIG. 5 is a schematic structural diagram of a control device according to an embodiment of the application.

FIG. 5 shows a schematic structural diagram of a control device according to an embodiment of the application. As shown in FIG. 5, the control device in this embodiment is located in a network virtualization system, and the control device may include: a creating unit 51, a generating unit 52, an obtaining unit 53, an acquiring unit 54, an allocating unit 55, a search unit 56, and a sending unit 57, where the creating unit 51 is configured to create, on the control device, a virtual remote logical interface for an external interface of a remote node, where the external interface of the remote node is an interface used to connect to another network device;

the generating unit 52 is configured to: after the creating unit 51 creates the virtual remote logical interface, generate a multicast tree tunnel that uses a core node as a root;

the obtaining unit 53 is configured to: after the generating unit 52 generates the multicast tree tunnel, obtain a multicast protocol packet, where the multicast protocol packet is a protocol packet sent by a device outside the network virtualization system by using the remote node or the core node of the network virtualization system;

the acquiring unit 54 is configured to: after the obtaining unit 53 obtains the multicast protocol packet, acquire a multicast source address and a multicast group address from the multicast protocol packet;

the generating unit 52 is further configured to: after the acquiring unit 54 acquires the multicast source address and the multicast group address, generate a multicast forwarding table according to the multicast source address, the multicast group address, a multicast inbound interface, and a multicast outbound interface, where the multicast outbound interface includes an external interface of the core node and the virtual remote logical interface;

the allocating unit 55 is configured to allocate a P2MP PW label to the multicast source address and the multicast group address;

the search unit 56 is configured to: after the generating unit 52 generates the multicast forwarding table, search the multicast forwarding table for the external interface of the core node;

the generating unit 52 is further configured to: after the search unit 56 finds the external interface of the core node, search for an outbound interface of the multicast tree tunnel on the core node according to the multicast tree tunnel, and generate a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and the sending unit 57 is configured to: after the generating unit generates the P2MP PW multicast forwarding table, send the P2MP PW multicast forwarding table of the core node to the core node, so that the core node forwards a multicast data packet according to the P2MP PW multicast forwarding table.

In an optional implementation scenario, the search unit 56 is further configured to search the multicast forwarding table for the virtual remote logical interface;

the acquiring unit 54 is further configured to acquire the external interface of the remote node according to a mapping relationship between the virtual remote logical interface and the external interface of the remote node;

the search unit 56 is further configured to search for an outbound interface of the multicast tree tunnel on the remote node according to the multicast tree tunnel;

the generating unit 52 is further configured to generate a P2MP PW multicast forwarding table of the remote node according to the external interface of the remote node, the outbound interface of the multicast tree tunnel on the remote node, and the P2MP PW label; and the sending unit 57 is further configured to send the P2MP PW multicast forwarding table of the remote node to the remote node, so that the remote node forwards a multicast data packet according to the P2MP PW multicast forwarding table.

For example, the foregoing multicast inbound interface is an outbound interface that is corresponding to the multicast source address and in a preset unicast forwarding table searched according to the multicast source address.

In an optional implementation scenario, the foregoing obtaining unit 53 may be specifically configured to:

when the multicast protocol packet is a protocol packet that is sent by the device outside the network virtualization system and received by the remote node, receive the multicast protocol packet transparently transmitted through a point-to-point pseudo wire P2P PW established between the core node and the remote node, and through a control channel between the core node and a controller; or when the multicast protocol packet is a protocol packet that is sent by the device outside the network virtualization system and received by the core node, receive the multicast protocol packet through a control channel between the core node and a controller.

When the control device in this embodiment independently serves as a device in a network virtualization system, the control device may generate a P2MP PW multicast forwarding table of a core node and a P2MP PW multicast forwarding table of a remote node, and further send the P2MP PW multicast forwarding table of the core node to the core node, so that the core node forwards a multicast data packet according to the P2MP PW multicast forwarding table of the core node, and the control device sends the P2MP PW multicast forwarding table of the remote node to the remote node, so that the remote node forwards a multicast data packet according to the P2MP PW multicast forwarding table of the remote node. In this way, the network virtualization system can support a multicast service, thereby resolving a problem in the prior art that a cluster router cannot implement a multicast service.

Figure 6:
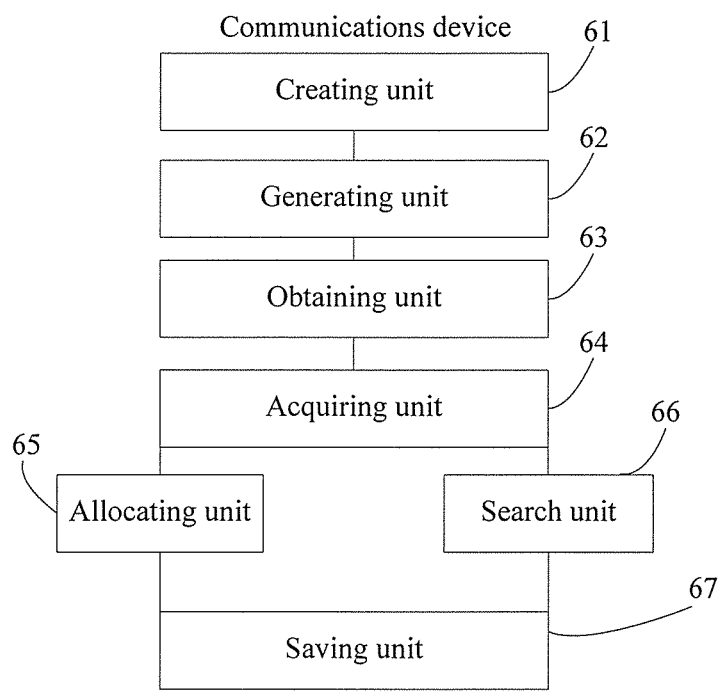
FIG. 6 is a schematic structural diagram of a communications device according to an embodiment of the application.

FIG. 6 is a schematic structural diagram of a communications device according to an embodiment of the application. As shown in FIG. 6, the communications device is located in a network virtualization system, and the communications device in this embodiment may include: a creating unit 61, a generating unit 62, an obtaining unit 63, an acquiring unit 64, an allocating unit 65, a search unit 66, and a saving unit 67, where the creating unit 61 is configured to create, on the communications device, a virtual remote logical interface for an external interface of a remote node, where the external interface of the remote node is an interface used to connect to another network device;

the generating unit 62 is configured to: after the creating unit 61 creates the virtual remote logical interface, generate a multicast tree tunnel that uses the communications device as a root;

the obtaining unit 63 is configured to: after the generating unit 62 generates the multicast tree tunnel, obtain a multicast protocol packet, where the multicast protocol packet is a protocol packet sent by a device outside the network virtualization system by using the remote node or the communications device of the network virtualization system;

the acquiring unit 64 is configured to: after the obtaining unit 63 obtains the multicast protocol packet, acquire a multicast source address and a multicast group address from the multicast protocol packet;

the generating unit 62 is further configured to: after the acquiring unit 64 acquires the multicast source address and the multicast group address, generate a multicast forwarding table according to the multicast source address, the multicast group address, a multicast inbound interface, and a multicast outbound interface, where the multicast outbound interface includes an external interface of the communications device and the virtual remote logical interface;

the allocating unit 65 is configured to allocate a P2MP PW label to the multicast source address and the multicast group address;

the search unit 66 is configured to: after the generating unit 62 generates the multicast forwarding table, search the multicast forwarding table for the external interface of the communications device, and search for an outbound interface of the multicast tree tunnel on the communications device according to the multicast tree tunnel;

the generating unit 62 is further configured to: after the search unit 66 finds the outbound interface of the communications device, generate a point-to-multipoint pseudo wire P2MP PW multicast forwarding table of the communications device according to the multicast source address, the multicast group address, the multicast inbound interface, the external interface of the communications device, and the outbound interface of the multicast tree tunnel on the communications device; and the saving unit 67 is configured to: after the generating unit 62 generates the P2MP PW multicast forwarding table, save the P2MP PW multicast forwarding table of the communications device, so that the communications device forwards a multicast data packet according to the P2MP PW multicast forwarding table.

In a specific implementation manner, the foregoing communications device may further include a sending unit 68, which is not shown in the figure, where, the search unit 66 is further configured to search the multicast forwarding table for the virtual remote logical interface;

the acquiring unit 64 is further configured to acquire the external interface of the remote node according to a mapping relationship between the virtual remote logical interface and the external interface of the remote node;

the search unit 66 is further configured to search for an outbound interface of the multicast tree tunnel on the remote node according to the multicast tree tunnel;

the generating unit 62 is further configured to generate a P2MP PW multicast forwarding table of the remote node according to the external interface of the remote node, the outbound interface of the multicast tree tunnel on the remote node, and the P2MP PW label; and the sending unit 68 is configured to send the P2MP PW multicast forwarding table of the remote node to the remote node, so that the remote node forwards a multicast data packet according to the P2MP PW multicast forwarding table.

For example, the foregoing multicast inbound interface may be an outbound interface that is corresponding to the multicast source address and in a preset unicast forwarding table searched according to the multicast source address.

In a specific implementation manner, the foregoing obtaining unit 63 may be specifically configured to: when the multicast protocol packet is a protocol packet that is sent by the device outside the network virtualization system and received by the remote node, receive the multicast protocol packet transparently transmitted through a point-to-point pseudo wire P2P PW established between the communications device and the remote node, and through a control channel between the communications device and a controller.

When the communications device in this embodiment serves as a control device in a network virtualization system, the communications device may generate a P2MP PW multicast forwarding table of a core node and a P2MP PW multicast forwarding table of a remote node, and further save the P2MP PW multicast forwarding table of the core node, so that the core node forwards a multicast data packet according to the P2MP PW multicast forwarding table of the core node, and the control device sends the P2MP PW multicast forwarding table of the remote node to the remote node, so that the remote node forwards a multicast data packet according to the P2MP PW multicast forwarding table of the remote node. In this way, the network virtualization system can support a multicast service, thereby resolving a problem in the prior art that a cluster router cannot implement a multicast service.

Figure 7:
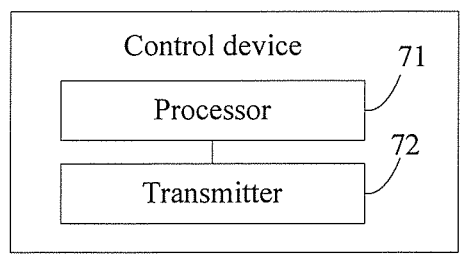
FIG. 7 is a schematic structural diagram of a control device according to another embodiment of the application.

FIG. 7 is a schematic structural diagram of a control device according to an embodiment of the application. As shown in FIG. 7, the control device is located in a network virtualization system, and the control device in this embodiment may include: a processor 71 and a transmitter 72, where the processor 71 is configured to create a virtual remote logical interface for an external interface of a remote node, where the external interface of the remote node is an interface used to connect to another network device; and the processor is further configured to generate a multicast tree tunnel that uses a core node as a root; and obtain a multicast protocol packet, where the multicast protocol packet is a protocol packet sent by a device outside the network virtualization system by using the remote node or the core node of the network virtualization system;

acquire a multicast source address and a multicast group address from the multicast protocol packet;

generate a multicast forwarding table according to the multicast source address, the multicast group address, a multicast inbound interface, and a multicast outbound interface, where the multicast outbound interface includes an external interface of the core node and the virtual remote logical interface;

allocate a P2MP PW label to the multicast source address and the multicast group address; and search the multicast forwarding table for the external interface of the core node, search for an outbound interface of the multicast tree tunnel on the core node according to the multicast tree tunnel, and generate a point-to-multipoint pseudo wire P2MP PW multicast forwarding table of the core node according to the multicast source address, the multicast group address, the P2MP PW label, the multicast inbound interface, the external interface of the core node, and the outbound interface of the multicast tree tunnel on the core node; and the transmitter 72 is configured to: after the processor 71 generates the P2MP PW multicast forwarding table of the core node, send the P2MP PW multicast forwarding table of the core node to the core node, so that the core node forwards a multicast data packet according to the P2MP PW multicast forwarding table.

In specific application, the foregoing processor 91 is further configured to:

search the multicast forwarding table for the virtual remote logical interface;

acquire the external interface of the remote node according to a mapping relationship between the virtual remote logical interface and the external interface of the remote node;

search for an outbound interface of the multicast tree tunnel on the remote node according to the multicast tree tunnel; and generate a P2MP PW multicast forwarding table of the remote node according to the external interface of the remote node, the outbound interface of the multicast tree tunnel on the remote node, and the P2MP PW label.

The transmitter 92 is further configured to send the P2MP PW multicast forwarding table of the remote node to the remote node, so that the remote node forwards a multicast data packet according to the P2MP PW multicast forwarding table.

For example, the foregoing multicast inbound interface may be an outbound interface that is corresponding to the multicast source address and in a preset unicast forwarding table searched according to the multicast source address.

Further, in actual application, a specific process of obtaining a multicast protocol packet by the processor 71 is as follows:

when the multicast protocol packet is a protocol packet that is sent by the device outside the network virtualization system and received by the remote node, receiving the multicast protocol packet transparently transmitted through a point-to-point pseudo wire P2P PW established between the core node and the remote node, and through a control channel between the core node and a controller; or when the multicast protocol packet is a protocol packet that is sent by the device outside the network virtualization system and received by the core node, receiving the multicast protocol packet through a control channel between the core node and a controller.

When the control device in this embodiment independently serves as a device in a network virtualization system, the control device may generate a P2MP PW multicast forwarding table of a core node and a P2MP PW multicast forwarding table of a remote node, and further send the P2MP PW multicast forwarding table of the core node to the core node, so that the core node forwards a multicast data packet according to the P2MP PW multicast forwarding table of the core node, and the control device sends the P2MP PW multicast forwarding table of the remote node to the remote node, so that the remote node forwards a multicast data packet according to the P2MP PW multicast forwarding table of the remote node. In this way, the network virtualization system can support a multicast service, thereby resolving a problem in the prior art that a cluster router cannot implement a multicast service.

Figure 8:
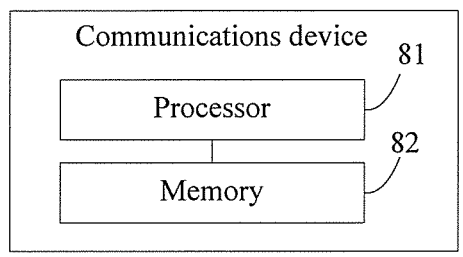
FIG. 8 is a schematic structural diagram of a communications device according to another embodiment of the application.

FIG. 8 is a schematic structural diagram of a communications device according to an embodiment of the application. The communications device is located in a network virtualization system, and as shown in FIG. 8, the communications device in this embodiment may include: a processor 81 and a memory 82, where the processor 81 is configured to create, on the communications device, a virtual remote logical interface for an external interface of a remote node, where the external interface of the remote node is an interface used to connect to another network device;

generate a multicast tree tunnel that uses the communications device as a root;

obtain a multicast protocol packet, where the multicast protocol packet is a protocol packet sent by a device outside the network virtualization system by using the remote node or the communications device of the network virtualization system;

acquire a multicast source address and a multicast group address from the multicast protocol packet;

generate a multicast forwarding table according to the multicast source address, the multicast group address, a multicast inbound interface, and a multicast outbound interface, where the multicast outbound interface includes an external interface of the communications device and the virtual remote logical interface;

allocate a P2MP PW label to the multicast source address and the multicast group address; and search the multicast forwarding table for the external interface of the communications device, search for an outbound interface of the multicast tree tunnel on the communications device according to the multicast tree tunnel, and generate a point-to-multipoint pseudo wire P2MP PW multicast forwarding table of the communications device according to the multicast source address, the multicast group address, the P2MP PW label, the multicast inbound interface, the external interface of the communications device, and the outbound interface of the multicast tree tunnel on the communications device; and the memory 82 is configured to save the P2MP PW multicast forwarding table of the communications device, so that the communications device forwards a multicast data packet according to the P2MP PW multicast forwarding table.

In a specific application scenario, the processor 81 is further configured to:

search the multicast forwarding table for the virtual remote logical interface;

acquire the external interface of the remote node according to a mapping relationship between the virtual remote logical interface and the external interface of the remote node;

search for an outbound interface of the multicast tree tunnel on the remote node according to the multicast tree tunnel; and generate a P2MP PW multicast forwarding table of the remote node according to the external interface of the remote node, the outbound interface of the multicast tree tunnel on the remote node, and the P2MP PW label.

Further, the communications device further includes a transmitter 83, which is not shown in FIG. 8.

The transmitter 83 is configured to send the P2MP PW multicast forwarding table of the remote node to the remote node, so that the remote node forwards a multicast data packet according to the P2MP PW multicast forwarding table.

For example, the foregoing multicast inbound interface may be an outbound interface that is corresponding to the multicast source address and in a preset unicast forwarding table searched according to the multicast source address.

Specifically, a specific process of obtaining a multicast protocol packet by the processor 81 is as follows: when the multicast protocol packet is a protocol packet that is sent by the device outside the network virtualization system and received by the remote node, receiving the multicast protocol packet transparently transmitted through a point-to-point pseudo wire P2P PW established between the communications device and the remote node, and through a control channel between the communications device and a controller.

When the communications device in this embodiment serves as a control device in a network virtualization system, the communications device may generate a P2MP PW multicast forwarding table of a core node and a P2MP PW multicast forwarding table of a remote node, and further save the P2MP PW multicast forwarding table of the core node, so that the core node forwards a multicast data packet according to the P2MP PW multicast forwarding table of the core node, and the control device sends the P2MP PW multicast forwarding table of the remote node to the remote node, so that the remote node forwards a multicast data packet according to the P2MP PW multicast forwarding table of the remote node. In this way, the network virtualization system can support a multicast service, thereby resolving a problem in the prior art that a cluster router cannot implement a multicast service.

It may be known from the foregoing that, the communications device in this embodiment is located in a network virtualization system, a service connection between nodes inside the network virtualization system can be implemented through an internal data transmission channel, and further, continuity of a multicast service in the network virtualization system is achieved, so that the network virtualization system can support forwarding of a multicast data packet with high efficiency and quality.

In addition, an embodiment of the application further provides a network virtualization system, and with reference to FIG. 1A to FIG. 1C, the network virtualization system in this embodiment of the application includes: a core node, an intermediate remote node connected to the core node, and a remote node connected to the intermediate remote node, where the core node is specifically configured to:

receive a multicast data packet, and search a point-to-multipoint pseudo wire P2MP PW multicast forwarding table of the core node according to the multicast data packet;

if it is determined that a forwarding outbound interface of the multicast data packet is an internal outbound interface of the core node, encapsulate, by the core node, a P2MP PW label and a label of a multicast tree tunnel into the multicast data packet, to obtain a first multicast data packet; and send the first multicast data packet to the intermediate remote node through the internal outbound interface of the core node, where the internal outbound interface of the core node is an outbound interface of the multicast tree tunnel on the core node;

the intermediate remote node is specifically configured to:

receive the first multicast data packet, acquire the P2MP PW label from the first multicast data packet, search a P2MP PW multicast forwarding table of the intermediate remote node according to the P2MP PW label, and acquire a matching multicast forwarding outbound interface;

if the matching multicast forwarding outbound interface is an outbound interface of the multicast tree tunnel on the intermediate remote node, swap, by the intermediate remote node, an incoming label by an outgoing label in the label of the multicast tree tunnel according to the first multicast data packet, to obtain a second multicast data packet; and send, by the intermediate remote node, the second multicast data packet through the outbound interface of the multicast tree tunnel on the intermediate remote node; and if the matching multicast forwarding outbound interface is an external interface of the intermediate remote node, send, by the intermediate remote node, the first multicast data packet to the remote node directly through the external interface of the intermediate remote node; and the remote node is specifically configured to:

receive the second multicast data packet, acquire the P2MP PW label from the second multicast data packet, search a P2MP PW multicast forwarding table of the remote node according to the P2MP PW label, and acquire a matching multicast forwarding outbound interface;

decapsulate, by the remote node, the label of the multicast tree tunnel and the P2MP PW label that are in the second multicast data packet, to obtain a third multicast data packet; and send, by the remote node, the third multicast data packet through the matching multicast forwarding outbound interface.

Optionally, the core node is further configured to: if it is determined that the forwarding outbound interface of the multicast data packet is an external interface of the core node, send, by the core node, the multicast data packet directly through the external interface of the core node.

The foregoing network virtualization system achieves continuity of a multicast service in the network virtualization system, and further a core node, an intermediate remote node, and a remote node in the system can implement a multicast service, that is, support forwarding of a multicast data packet.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the application rather than limiting the application. Although the application is described in detail with reference to the foregoing embodiments, persons of ordinary skill in the art should understand that they may still make modifications to the technical solutions recorded in the foregoing embodiments or make equivalent replacements to some or all technical features thereof, as long as such modifications or replacements do not cause the essence of corresponding technical solutions to depart from the scope of the technical solutions of the embodiments of the application.

What is claimed is:

1. A method for establishing a multicast data channel in a network virtualization system, the method comprising:

creating, on a controller, a virtual remote logical interface for an external interface of a remote node of the network virtualization system, wherein the external interface of the remote node is an interface used to connect to another network device;

generating, by the controller, a multicast tree tunnel that uses a core node of the network virtualization system as a root;

obtaining, by the controller, a multicast protocol packet by using the remote node or the core node of the network virtualization system, wherein the multicast protocol packet is a protocol packet sent by a device outside the network virtualization system;

acquiring, by the controller, a multicast source address and a multicast group address from the multicast protocol packet;

generating, by the controller, a multicast forwarding table according to the multicast source address, the multicast group address, a multicast inbound interface, and a multicast outbound interface, wherein the multicast outbound interface comprises an external interface of the core node and the virtual remote logical interface;

allocating, by the controller, a point-to-multipoint pseudo wire (P2MP PW) label to the multicast source address and the multicast group address;

searching, by the controller, the multicast forwarding table for the external interface of the core node;

searching for an outbound interface, on the core node, of the multicast tree tunnel according to the multicast tree tunnel;

generating a P2MP PW multicast forwarding table of the core node according to the multicast source address, the multicast group address, the P2MP PW label, the multicast inbound interface, the external interface of the core node, and the outbound interface, on the core node, of the multicast tree tunnel; and sending, by the controller, the P2MP PW multicast forwarding table of the core node to the core node, so that the core node forwards a multicast data packet according to the P2MP PW multicast forwarding table.

2. The method according to claim 1, further comprising:

searching, by the controller, the multicast forwarding table for the virtual remote logical interface;

acquiring, by the controller, the external interface of the remote node according to a mapping relationship between the virtual remote logical interface and the external interface of the remote node;

searching, by the controller, for an outbound interface, on the remote node, of the multicast tree tunnel according to the multicast tree tunnel;

generating, by the controller, a P2MP PW multicast forwarding table of the remote node according to the external interface of the remote node, the outbound interface, on the remote node, of the multicast tree tunnel, and the P2MP PW label; and sending, by the controller, the P2MP PW multicast forwarding table of the remote node to the remote node, so that the remote node forwards a multicast data packet according to the P2MP PW multicast forwarding table of the remote node.

3. The method according to claim 1, wherein the obtaining, by the controller, the multicast protocol packet comprises:

when the multicast protocol packet is a protocol packet that is sent by the device outside the network virtualization system and received by the remote node, receiving, by the controller, the multicast protocol packet transparently transmitted through a point-to-point pseudo wire (P2P PW) established between the core node and the remote node, and through a control channel between the core node and the controller; or when the multicast protocol packet is a protocol packet that is sent by the device outside the network virtualization system and received by the core node, receiving, by the controller, the multicast protocol packet through a control channel between the core node and the controller.

4. A control device for use in a network virtualization system, the control device comprising:
a processor, configured to:
    create a virtual remote logical interface for an external interface of a remote node of the network virtualization system, wherein the external interface of the remote node is an interface used to connect to another network device,
    generate a multicast tree tunnel that uses a core node of the network virtualization system as a root,
    obtain a multicast protocol packet by using the remote node or the core node of the network virtualization system, wherein the multicast protocol packet is a protocol packet sent by a device outside the network virtualization system,
    acquire a multicast source address and a multicast group address from the multicast protocol packet,
    generate a multicast forwarding table according to the multicast source address, the multicast group address, a multicast inbound interface, and a multicast outbound interface, wherein the multicast outbound interface comprises an external interface of the core node and the virtual remote logical interface,
    allocate a point-to-multipoint pseudo wire (P2MP PW) label to the multicast source address and the multicast group address,
    search the multicast forwarding table for the external interface of the core node,
    search for an outbound interface, on the core node, of the multicast tree tunnel according to the multicast tree tunnel, and
    generate a P2MP PW multicast forwarding table of the core node according to the multicast source address, the multicast group address, the P2MP PW label, the multicast inbound interface, the external interface of the core node, and the outbound interface, on the core node, of the multicast tree tunnel; and a transmitter, configured to:
    after the processor generates the P2MP PW multicast forwarding table of the core node, send the P2MP PW multicast forwarding table of the core node to the core node, so that the core node forwards a multicast data packet according to the P2MP PW multicast forwarding table of the remote node.

5. The control device according to claim 4, wherein:
the processor is further configured to:
    search the multicast forwarding table for the virtual remote logical interface,
    acquire the external interface of the remote node according to a mapping relationship between the virtual remote logical interface and the external interface of the remote node,
    search for an outbound interface, on the remote node, of the multicast tree tunnel according to the multicast tree tunnel, and
    generate a P2MP PW multicast forwarding table of the remote node according to the external interface of the remote node, the outbound interface, on the remote node, of the multicast tree tunnel, and the P2MP PW label; and
the transmitter is further configured to:
    send the P2MP PW multicast forwarding table of the remote node to the remote node, so that the remote node forwards a multicast data packet according to the P2MP PW multicast forwarding table of the remote node.

6. The control device according to claim 4, wherein the processor is configured to:
when the multicast protocol packet is a protocol packet that is sent by the device outside the network virtualization system and received by the remote node, receive the multicast protocol packet transparently transmitted through a point-to-point pseudo wire (P2P PW) established between the core node and the remote node, and through a control channel between the core node and the control device; or
when the multicast protocol packet is a protocol packet that is sent by the device outside the network virtualization system and received by the core node, receive the multicast protocol packet through a control channel between the core node and the control device.

* * * * *